US006397686B1

United States Patent
Taivalkoski et al.

(10) Patent No.: US 6,397,686 B1
(45) Date of Patent: Jun. 4, 2002

(54) HALL-EFFECT SENSOR PLACED IN FLOWMETER TO MEASURE FUEL FLOW RATE

(75) Inventors: Tom Taivalkoski, Fort Wayne, IN (US); Harald Görres, Weilheim; Hans Ulrich Bloss, Nuremberg, both of (DE)

(73) Assignee: Tokheim Corporation, Fort Wayne, IN (US)

( * ) Notice: Subject to any disclaimer, the term of this patent is extended or adjusted under 35 U.S.C. 154(b) by 0 days.

(21) Appl. No.: 09/369,874

(22) Filed: Aug. 9, 1999

(51) Int. Cl.$^7$ ............................................. G01F 15/06
(52) U.S. Cl. ................................................... 73/861.78
(58) Field of Search ........................... 73/861.78, 861.77, 73/229, 861.91; 235/92; 137/80; 233/60

(56) References Cited

U.S. PATENT DOCUMENTS

| | | | |
|---|---|---|---|
| 4,032,066 A | * 6/1977 | Wright | ........................ 233/26 |
| 4,101,056 A | 7/1978 | Mattimoe et al. | |
| 4,275,291 A | * 6/1981 | Feller | ..................... 235/92 FL |
| 4,333,354 A | 6/1982 | Feller | |
| 4,395,919 A | 8/1983 | Peters | |
| 4,404,638 A | 9/1983 | Yada et al. | |
| 4,408,498 A | 10/1983 | Heath | |
| 4,700,579 A | 10/1987 | Hall | |
| 5,050,094 A | 9/1991 | Kitano | |
| 5,205,161 A | 4/1993 | Erwin | |
| 5,228,469 A | * 7/1993 | Otten et al. | ..................... 137/80 |
| 5,447,062 A | 9/1995 | Köpl et al. | |
| 5,456,121 A | 10/1995 | Lew et al. | |
| 5,557,084 A | 9/1996 | Myers et al. | |
| 5,965,825 A | * 10/1999 | Nitecki | ..................... 73/861.77 |
| 6,257,073 B1 | * 7/2001 | Lee | ........................ 73/861.77 |

* cited by examiner

Primary Examiner—Benjamin R. Fuller
Assistant Examiner—Jewel V. Thompson
(74) Attorney, Agent, or Firm—Randall J. Knuth

(57) ABSTRACT

A pick-up assembly for use in a liquid dispensing system utilizes a Hall-effect sensor integrated within a flowmeter to provide a measure of the rotational velocity of the rotor and hence the flow rate of liquid being transmitted through the liquid line. The rotor is modified to include at least one recessed area defined in its outer surface and which exhibits magnetic properties. The Hall-effect sensor includes a first and second Hall-effect element each generating a respective channel signal that is representative of the rotational velocity of the rotor. The Hall-effect sensor is suitably arranged with respect to the rotor so as to enable each one of the recessed areas to exert a characteristic magnetic influence upon the Hall-effect sensor during shaft rotation. The variable magnetic flux experienced by the Hall-effect sensor appears as a corresponding variation in the voltage signal generated by the sensor. The rate of generation of such magnetic field variations is representative of the rotational velocity of the rotor.

20 Claims, 2 Drawing Sheets

HALL-EFFECT SENSOR PLACED IN FLOWMETER TO MEASURE FUEL FLOW RATE

BACKGROUND OF THE INVENTION

1. Field of the Invention

The present invention relates to a fuel dispensing system for use in delivering fuel to a vehicle and, more particularly, to a sensor assembly integrated with the flowmeter that utilizes a Hall-effect device to measure the rotational velocity of the flowmeter rotor and hence the fuel flow rate by detecting recesses exhibiting magnetic properties that are formed in the rotor surface.

2. Description of the Related Art

Various configurations have been proposed that aim to measure the flow rate of fuel that is being communicated through the fuel line of a fuel dispensing system. In one conventional form, the measuring apparatus includes an arrangement of two pick-up devices each coupled to the flowmeter spindle shaft in a manner suitable for monitoring the rotational activity and direction of motion of the shaft so as to acquire signals representative of the rotational velocity of the shaft. Because the pick-up operation involves establishing at least two points of monitoring engagement with respect to the shaft, it is necessary that separate bore channels be formed into the rotor housing so as to accommodate each one of the pick-up devices. The drawbacks to this configuration involve the use of at least two pick-up devices and the installation requirement relating to the formation of separate mounting holes.

In another conventional apparatus, the flowmeter is modified for attachment to a sensor assembly that is configured within a separate housing structure. A disk is coaxially mounted at the end of the spindle shaft and is provided with magnets positioned at a circumferential portion thereof. The disk and accompanying magnets therefore move in tandem with the rotation of the spindle shaft. A pair of Hall-effect sensors are provided within the separate housing structure and are suitably positioned with respect to the mounted disk so as to be able to detect the rotation of the shaft by virtue of the coupling relationship a established with the magnets as they rotate with the disk. Among its disadvantages, this type of measurement apparatus requires a customized sensor design in addition to the utilization of an additional mounting disk and the construction of a separate sensor housing unit for attachment to the flowmeter.

SUMMARY OF THE INVENTION

According to the present invention there is provided an assembly for use in a fuel dispensing system that utilizes a Hall-effect pick-up device integrated within a flowmeter to provide a measure of the rotational velocity of the rotor and hence the flow rate of fuel being transmitted through the fuel line. The rotor is modified to include at least one discontinuity defined in its outer surface, preferably in the form of a recessed area. These recessed areas are suitably provided so as to exhibit magnetic properties. The Hall-effect sensor includes a first and second Hall-effect element each generating a respective channel signal that is representative of the rotational velocity of the rotor. The Hall-effect sensor is suitably arranged with respect to the rotor so as to enable each one of the recessed areas to exert a characteristic magnetic influence upon the Hall-effect sensor during shaft rotation. In particular, the Hall-effect elements each detect the occurrence of each one of the recessed areas as it rotates therepast during shaft rotation and generates within its respective channel signal a representation of each such detected occurrence. These representations will typically take the form of a signal variation that is attributable to the variation in magnetic field experienced by the Hall-effect element as the recessed area rotates past it. The rate of generation of such magnetic field variations (as manifested in the sensor channel signals as corresponding variations in a signal parameter or characteristic, i.e, voltage) is representative of the rotational velocity of the rotor. A processor provides a measure of the fuel flow rate as derived from the sensor channel signals. This sensor configuration requires the formation of only a single mounting hole for accommodating the mounting attachment of the pick-up device to the flowmeter. A temperature sensor is preferably integrated with the Hall-effect sensor to provide a measure of the fuel temperature.

The invention, in one form thereof, is directed to an assembly for use in a fuel dispensing system. The assembly comprises a flowmeter coupled to a fuel line of the fuel dispensing system and including a rotor; and a pick-up assembly integral with the flowmeter and operative to provide a measure of the flow rate of fuel in the fuel line as a function of the rotational velocity of the rotor. The pick-up assembly comprises a Hall-effect sensor arranged proximate the rotor and operative to provide at least one output signal representative of the rotational velocity of the rotor. The rotor includes at least one recessed area formed therein exhibiting magnetic properties and being suitably arranged with respect to the Hall-effect sensor so as to enable the at least one recessed area to exert a characteristic magnetic influence upon the Hall-effect sensor during rotor rotation. The assembly further comprises a processor that is operative to provide a measure of the fuel flow rate in the fuel line as derived from the at least one output signal provided by the Hall-effect sensor.

The Hall-effect sensor, in one form thereof, further includes a first Hall-effect element generating a first channel signal representative of the rotational velocity of the rotor; and a second Hall-effect element generating a second channel signal representative of the rotational velocity of the rotor. The first channel signal generated by the first Hall-effect element and the second channel signal generated by the second Hall-effect element preferably have a predetermined phase-shift therebetween. In one form, the first Hall-effect element and the second Hall-effect element are arranged relative to one another in a spaced-apart relationship that is sufficient to cause a 90 degree phase-shift between the respective first channel signal and the second channel signal generated thereby. The processor evaluates the first channel signal generated by the first Hall-effect element and the second channel signal generated by the second Hall-effect element to derive the measure and flow direction of the fuel flow rate.

The at least one recessed area further comprises, in one form thereof, a set of three recessed areas disposed in spaced-apart relationship about the circumferential surface of the rotor. The Hall-effect sensor, in one form thereof, is disposed at least in part within a housing structure mounted to the flowmeter, wherein such flowmeter mounting is characterized by the use of a single mounting space defined in the flowmeter for receiving, at least in part, the housing structure. The assembly further includes, in one form thereof, a temperature sensor integrally associated with the pick-up assembly and which is suitably arranged with respect to the fuel line of the fuel dispensing system to operatively provide a measure of the fuel temperature.

The invention, in another form thereof, relates to an assembly for use in a fuel dispensing system. The assembly comprises a flowmeter coupled to a fuel line of the fuel dispensing system and including a rotor, wherein such rotor includes at least one discontinuity provided in the circumferential surface thereof to define a discontinuous portion of the rotor; a detection means, which is disposed proximate the rotor at the discontinuous portion thereof, for detecting the is occurrence of each one of the at least one rotor discontinuity rotating therepast and for generating at least one signal representative of the rotational velocity of the rotor as derived from the rate of detected occurrence of at least one of the at least one rotor discontinuity; and a means for providing a measure of the flow rate of fuel in the fuel line as derived from the at least one signal generated by the detection means. In a preferred form, each one of the at least one rotor discontinuity exhibits magnetic properties.

The detection means, in one form thereof, further includes a Hall-effect sensor suitably arranged with respect to the at least one rotor discontinuity so as to enable each one of the at least one rotor discontinuity to exert a characteristic magnetic influence upon the Hall-effect sensor during rotor rotation. Each one of the at least one rotor discontinuity further includes, in one form thereof, a recessed area formed in the rotor.

The Hall-effect sensor further includes, in one form thereof, a first Hall-effect element generating a first channel signal representative of the rotational velocity of the rotor; and a second Hall-effect element generating a second channel signal representative of the rotational velocity of the rotor. The first channel signal generated by the first Hall-effect element and the second channel signal generated by the second Hall-effect element have a predetermined phase-shift therebetween. In a preferred form, the first Hall-effect element and the second Hall-effect element are arranged relative to one another in a spaced-apart relationship that is sufficient to cause a 90 degree phase-shift between the respective first channel signal and the second channel signal generated thereby.

The at least one rotor discontinuity further includes, in one form thereof, a set of three recessed areas formed in the rotor and disposed in spaced-apart relationship about the circumferential surface of the rotor. Accordingly, for each complete rotation of the rotor, each one of the first channel signal and the second channel signal generated respectively by the first Hall-effect element and the second Hall-effect element includes a representation of the detected occurrence of each one of the set of three recessed areas formed in the rotor.

The Hall-effect sensor, in one form thereof, is disposed at least in part within a housing structure mounted to the flowmeter, wherein such flowmeter mounting is characterized by the use of a single mounting space defined in the flowmeter for receiving, at least in part, the housing structure. The assembly further includes, in one form thereof, a temperature sensor integrally associated with the detection means and being suitably arranged with respect to the fuel line of the fuel dispensing system to operatively provide a measure of the fuel temperature.

The invention, in another form thereof, is directed to an assembly for use in a fuel dispensing system. The assembly comprises a flowmeter coupled to a fuel line of the fuel dispensing system and including a rotor, wherein such rotor includes at least one discontinuity defined in the outer surface thereof and which exhibits magnetic properties; a Hall-effect sensor arranged relative to the rotor in a manner sufficient to enable the development of an inductive coupling relationship between each one of the at least one rotor discontinuity and the Hall-effect sensor during operative rotation of the rotor. The Hall-effect sensor comprises a first Hall-effect element generating a first channel signal representative of the rotational velocity of the rotor and a second Hall-effect element generating a second channel signal representative of the rotational velocity of the rotor, wherein the first channel signal and the second channel signal have a predetermined phase-shift therebetween. The assembly further comprises a processor that is operative to provide a measure of the flow rate of fuel in the fuel line based upon the first channel signal and the second channel signal generated respectively by the first Hall-effect element and the second Hall-effect element.

The at least one rotor discontinuity further comprises, in one form thereof, a set of three recessed areas disposed in spaced-apart relationship about the outer surface of the rotor. The Hall-effect sensor, in one form thereof, is disposed at least in part within a housing structure mounted to the flowmeter, wherein such flowmeter mounting is characterized by the use of a single mounting space defined in the flowmeter for receiving, at least in part, the housing structure. The assembly further comprises, in one form thereof, a temperature sensor integrally associated with the Hall-effect sensor and which is suitably arranged with respect to the fuel line of the fuel dispensing system to operatively provide a measure of the fuel temperature.

One advantage of the present invention is that a single Hall-effect sensor generating a first and second channel signal as disclosed herein is sufficient to measure the rotational velocity and flow direction of the flowmeter shaft.

Another advantage of the present invention is that the sensor configuration requires the formation of only a single mounting hole for accommodating the mounting attachment of the pick-up device to the flowmeter.

A further advantage of the invention is that the rotor may be easily adapted to facilitate its use with the Hall-effect sensor disclosed herein without imposing any limitation on its functionality within the flowmeter, namely by providing recessed areas in the rotor outer surface that exhibit magnetic properties.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
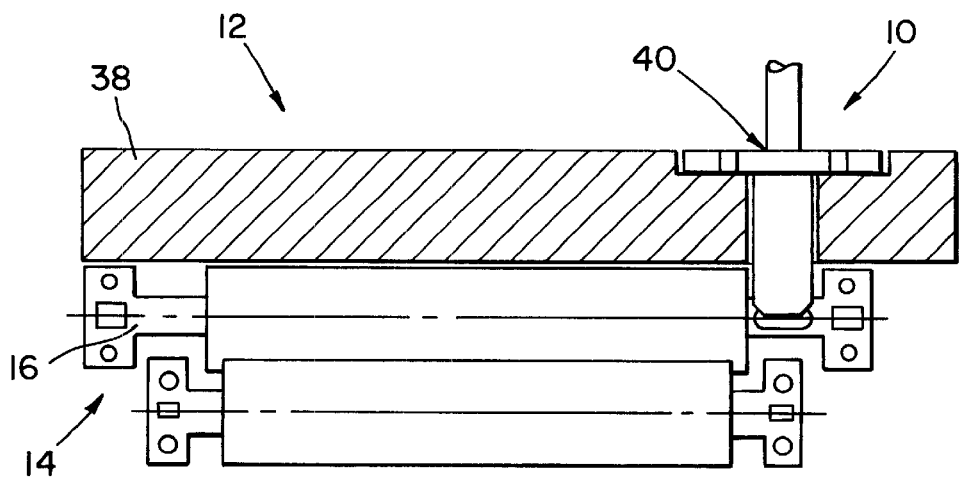
FIG. 1 is an elevational schematic view of the Hall-effect pick-up assembly according to one embodiment of the present invention as illustratively installed within the flowmeter apparatus shown in partial sectional view thereof.

Referring now to the drawings and particularly to FIG. 1, there is shown a pick-up assembly 10 according to one embodiment of the present invention as installed within a flowmeter apparatus 12 shown in partial sectional view thereof. Flowmeter 12 is of conventional design and comprises a rotor assembly indicated generally at 14 including a spindle shaft or rotor 16. Flowmeter 12 preferably constitutes part of a fuel dispensing system for delivering fuel to a vehicle at a service station, for example. However, the invention is not so limited but may be used within any type of flowmeter device integrated within other liquid delivery arrangements. In accordance with the present invention, and as will be described further, pick-up assembly 10 includes a Hall-effect sensor configured within a mounting structure that is integrally associated with flowmeter 12 in such a manner that enables the Hall-effect sensor of the present invention to operatively provide a measure of the rotational velocity of the rotor (i.e., revolutions-per-minute) and hence the flow rate of fuel being dispensed through flowmeter 12. FIG. 1 illustratively depicts the proximal relationship of pick-up assembly 10 to rotor 16 at one portion thereof that is modified according to the present invention such that certain regions of the rotor 16 are capable of generating a distinguishable magnetic flux that is recognizable and identifiable by the Hall-effect sensor as characteristic signal variations appearing in the Hall-effect sensor output signals.

Figure 2:
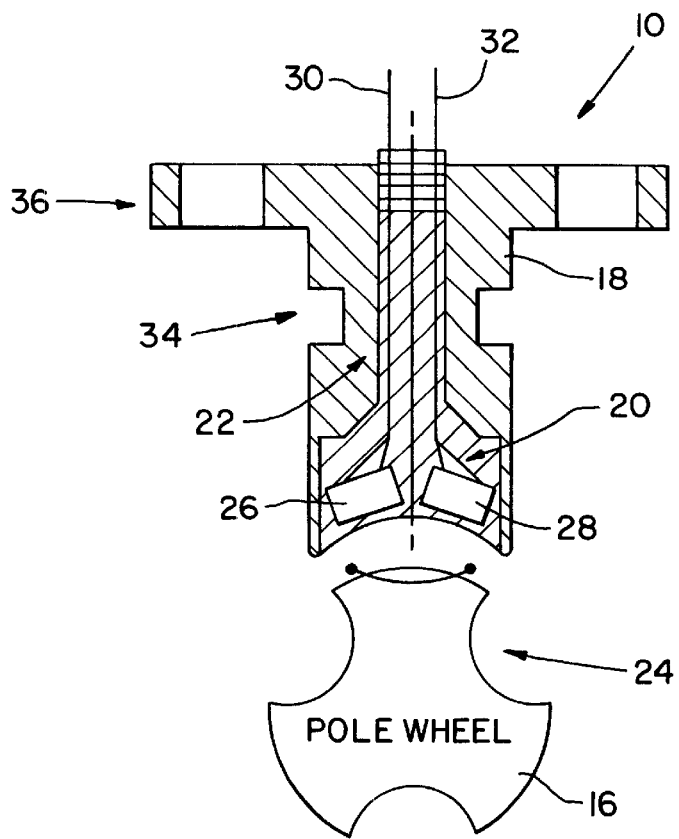
FIG. 2 is a cross-sectional schematic view of the pick-up assembly of FIG. 1 depicting the arrangement of Hall-effect sensing elements within their mountable housing structure and further illustrating their proximal relationship with respect to the rotor member, which is shown having the illustrated recess areas in accordance with one aspect of the present invention.
Figure 3A:
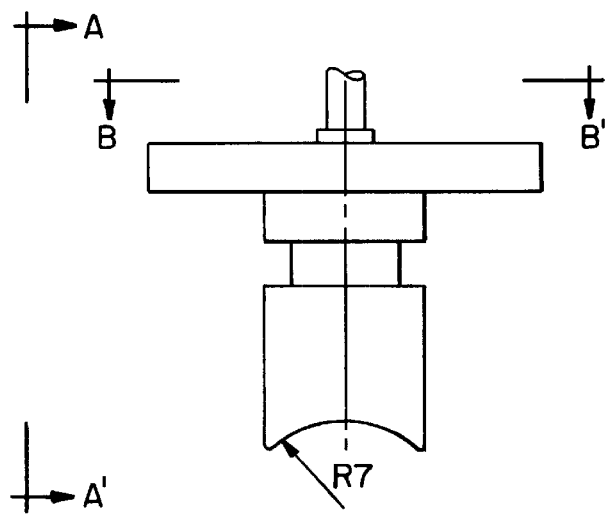
FIG. 3A is a front elevational schematic view illustrating a mounting structure for housing the Hall-effect sensing elements of the present invention and which is fixedly mounted to a section of the flowmeter apparatus.
Figure 3B:
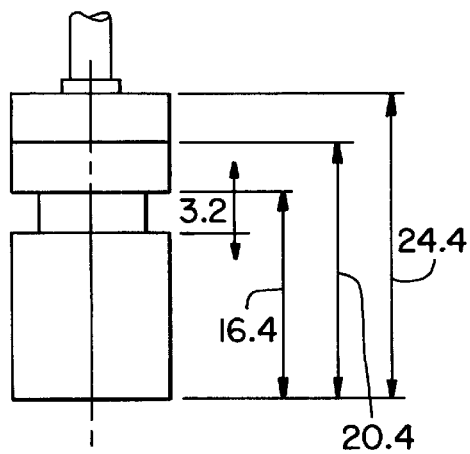
FIG. 3B is a lateral elevational schematic view of the mounting structure of FIG. 3A taken along lines A–A' therein.
Figure 3C:
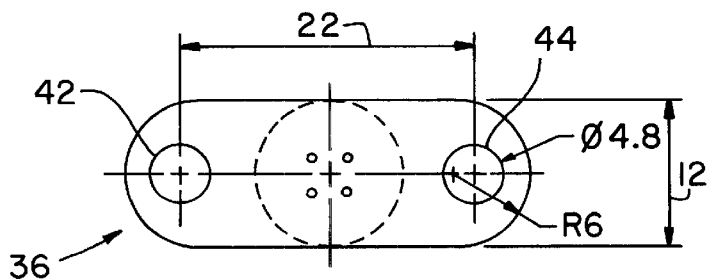
FIG. 3C is an upper elevational schematic view of the mounting structure of FIG. 3A taken along lines B–B' therein.

Referring more specifically to FIG. 1 in conjunction with FIG. 2 and FIGS. 3A–C, there is shown in FIG. 2 a cross-sectional schematic view of one illustrative pick-up assembly 10 comprising a mounting structure 18 for housing a Hall-effect sensor device indicated generally at 20 disposed within an interior installation space (shown generally at 22) of mounting structure 18. FIGS. 3A–C represent a series of views of mounting structure 18 depicting respectively a front elevational view, a lateral view taken along lines A–A' of FIG. 3A, and an upper view taken along lines B–B' of FIG. 3A.

By way of background, it is well known to those skilled in the art that the Hall effect involves the development of a potential difference across a current-carrying conductor when the conductor is subjected to a magnetic field. The potential difference is developed at right angles to both the current flow and to the magnetic field. Accordingly, if the magnetic system that is coupled to the Hall-effect conductors is arranged or operated in such a manner as to develop a non-uniform magnetic field (e.g., the magnetic field varies in a periodic manner), this magnetic field variation will produce a corresponding variation in the potential difference that is induced in the conductors according to the Hall-effect. Sensors that detect variations in the magnetic field experienced by the individual sensing elements (e.g., current-carrying conductor) can be constructed based upon this Hall-effect phenomenon.

In accordance with one aspect of the present invention, rotor 16 of flowmeter apparatus 12 is modified to include at least one region of discontinuity 24 defined in the outer circumferential surface thereof and which is provided in such a manner as to exhibit magnetic properties. For example, if rotor 16 is made of a magnetic or ferrous material, the regions of discontinuity in the outer surface of rotor 16 will generate a characteristic magnetic flux that is detectably distinct from the magnetic flux generated by the adjacent surface regions which conform to the conventional cylindrical shape for rotor 16. As will be described further, these variations in magnetic flux associated with the regions of discontinuity 24 are detected by A the Hall-effect sensor 20 of the present invention and used to provide a measure of the rotational velocity of rotor 16. The regions of discontinuity 24 are preferably provided in the form of a recessed area as illustratively shown in FIG. 2, although other suitable forms and shapes may be used within the scope of the present invention to enable the as-defined rotor discontinuity to exert a characteristic magnetic influence upon Hall-effect sensor 20. Rotor 16 is preferably provided as shown with a set of three recessed areas disposed in spaced-apart relationship about the circumferential surface of rotor 16, although it should be apparent to those skilled in the art that any number of such recessed areas may be provided. It should be noted that a rotor modified to include a single recessed area is sufficient to enable a determination of the rotational velocity of the rotor.

The number of slots or recesses directly effects measurement accuracy. The width of recess should also be equal to non-recess width as this effects the duty cycle 50 percent on and 50 percent off for each channel. There is also the need to get two signal phases out of the sensor to determine flow direction and to have a fail-safe signal. These two phases preferably should have an offset of about 90 degree phase shift against each other.

The number of slots could be increased by increasing the spindle shaft diameter thus creating more area for slots but this will also increase the meter's pressure drop due to reduced fluid flow path due to the larger sensor and rotor.

The preferred embodiment uses three slots or recesses as the optimal number of recesses for accuracy, duty cycle and obtaining the 90 degree phase shift.

The development of a Hall-effect within the Hall-effect sensor requires as conventionally known the introduction of the sensor elements into a magnetic field. A magnet is placed in the sensor creating a field between the sensor and steel rotor. If the rotor is made of a non-ferrous material a steel ring can be pressed onto the rotor thus having the magnetic properties. The magnet can also be placed on the rotor instead of in the sensor thus creating the required field.

An additional option is to use a Namur sensor, which creates a high frequency magnetic field by an oscillator and a wire coil. The recesses are then detected by a frequency change of the oscillator coil combination.

Referring to the illustrated Hall-effect sensor 20, this device preferably comprises a first Hall-effect sensing element 26 and a second Hall-effect sensing element 28 having respective electrical leads 30 and 32. The discrete Hall-effect elements 26 and 28 may be provided in any conventional form known to those skilled in the art such as a current-carrying conductor. In accordance with the present invention, the Hall-effect elements 26 and 28 are placed in a sufficiently proximate relationship relative to rotor 16 so as to enable each one of the recessed areas 24 to exert a characteristic magnetic influence upon each of the Hall-effect elements 26 and 28 as each one of the recessed areas 24 rotates in succession past elements 26 and 28. Stated otherwise, Hall-effect sensor 20 is arranged relative to rotor 16 in a manner sufficient to enable the development of an inductive coupling relationship between each one of the recessed areas 24 and Hall-effect sensor 20 during operative rotation of rotor 16. For this purpose, Hall-effect sensor 20 is preferably provided in the form of an electric inductive proximity sensor capable of detecting recesses 24 at the spindle shaft 16 by virtue of the differentiable magnetic field associated with each recess 24. It should be apparent that the manner of configuring Hall-effect sensor 20 within mounting structure 18 is not limited by the embodiment shown herein but extends to any other form of sensor installation that facilitates the development of the Hall-effect interaction between Hall-effect elements 26, 28 and the recessed areas 24 of rotor 16. Hall-effect sensor 20 may therefore be installed within mounting structure 18 by any conventional means known to those skilled in the art.

Referring briefly to FIGS. 3A–C, there is provided a mounting structure 18 having the illustrative dimensions and shape shown therein. The illustrated mounting structure 18 includes an elongated body or neck portion shown generally at 34 and a flange portion shown generally at 36 disposed at an upper end of body portion 34. The illustrated body portion 34 is sized and formed in a conventional way to accommodate the installation therein of Hall-effect sensor 20. Additionally, body portion 34 is appropriately formed to be registered within a suitably positioned mounting hole (shown generally at 40) defined within a structural member 38 (see FIG. 1) of flowmeter 12, which may correspond to a support arrangement for rotor assembly 14. As shown, this mounting hole 40 extends completely through structural member 38 and is suitably positioned such that the placement of mounting structure 18 therein results in the desired spatial registration/alignment of Hall-effect sensing elements 26 and 28 with respect to recessed areas 24 of rotor 16. The positioning of mounting structure 18 within mounting hole 40 is complete when flange portion 36 becomes seated within a flange receiving space defined in flowmeter member 38, preferably creating the illustrated flush engagement of the flange 36 upper surface with the member 38 upper surface. The illustrated pick-up assembly 10 is secured in its fully installed position through the use of attachment screws placed through screw-receiving slots 42 and 44 (see FIG. 3C) formed in flange portion 36 of mounting structure 18. The manner of attachment does not form part of the present invention as it should be apparent that other conventional means may be used to secure pick-up assembly 10 within flowmeter 12. Additionally, other types of mounting structures will be apparent to those skilled in the art.

Referring again to FIG. 2, the illustrated first Hall-effect element 26 generates a first channel output signal on lead 30 that is representative of the rotational velocity of rotor 16 while the illustrated second Hall-effect element 28 generates a second channel output signal on lead 32 that is likewise representative of the rotational velocity of rotor 16. For each complete revolution of the illustrated rotor 16, each one of the first and second channel output signals includes a representation of the detected occurrence of each one of the set of three recessed areas 24 formed in rotor 16. This representation may take the form of a distinguishing and identifiable variation in a signal parameter or characteristic. For example, the voltage signals induced in Hall-effect elements 26 and 28 by virtue of their respective inductive relationship with rotor 16 will manifest the occurrence of a magnetic interaction between one of the recessed areas 24 and an associated Hall-effect element (as the recessed area 24 rotates therepast) by the appearance of a corresponding voltage variation within the associated sensor channel output signal. The frequency of these voltage variations is representative of the rotational velocity of rotor 16.

In operation, the Hall-effect elements 26 and 28 each produces a voltage signal in response to and in accordance with A the magnetic interaction that develops between the respective Hall-effect element and the rotor or spindle shaft 16. In particular, the rotor 16 (at least the magnetic flux-generating recessed areas 24) exerts a magnetic influence upon the Hall-effect elements to thereby induce the voltage signal. Rotor 16 as disclosed is provided with non-uniform physical characteristics around its circumferential surface in order to allow the rotor to subject the Hall-effect element to a non-uniform magnetic flux that is dependent upon the particular rotor portion that is rotating past the Hall-effect element. In particular, the rotor is illustratively provided with three (3) recessed areas formed therein, preferably sized and dimensioned to be identically formed. The recessed areas exert a characteristic magnetic influence upon the Hall-effect element. The variable magnetic flux experienced by the Hall-effect element appears as a corresponding variation in the voltage signal generated by the Hall-effect sensor. For purposes of signal processing, the voltage variations may be considered to constitute voltage pulses for purposes of signal conditioning and/or detection by a pulse counting circuit (not shown). The rate of such pulse generation corresponds to a frequency value that is representative of the rotational speed of the rotor and hence the volume of dispensed fuel passing through the flowmeter.

In accordance with one aspect of the present invention, the first channel output signal generated by the first Hall-effect element 26 and the second channel output signal generated by the second Hall-effect element 28 have a predetermined phase-shift therebetween. Hall-effect elements 26 and 28 are preferably arranged relative to one another in a spaced-apart relationship that is sufficient to cause a 90 degree phase-shift between the respective channel signals generated thereby. Accordingly, for the illustrated embodiment characterized by the three shaft recess areas 24 and a pair of Hall-effect sensor elements 26 and 28, each full rotation of the shaft produces a first and second signal series phase-shifted by 90 degrees, wherein each signal series includes three "recess-detecting" electrical variation signals or characteristics (i.e., voltage pulses) each corresponding to the occurrence of a magnetic field variation experienced by the Hall-effect element as a respective recessed portion of the rotor rotates past the Hall-effect element and exerts its differentiable magnetic influence thereupon.

One output signal is sufficient to measure rotor speed. Two output signals are required to detect rotation direction and to have a fail safe signal means to determine if one signal output is dead or cannot be detected. If only one output signal was detected, the system would not be able to detect if the spindle was rotating or just vibrating on the edge of the recesses thus not rotating yet tripping the sensor.

The illustrated pick-up assembly 10 is preferably coupled by way of electrical leads 30 and 32 to an externally located processor or other such means (not shown) for processing the sensor channel output signals generated by first Hall-effect sensing element 26 and second Hall-effect sensing element 28. The processor, in one form thereof, is operative to provide a measure of the fuel flow rate as derived from the sensor channel output signals.

The output of the Hall-effect sensor output signals may be evaluated such as shown in co-pending U.S. patent application Ser. No. 08/925,864, assigned to assignee of the present application and hereby incorporated by reference.

In accordance with another aspect of the present invention, there is provided a temperature sensor (not shown) that is integrally associated with pick-up assembly 10 and which is suitably arranged with respect to the fuel flow through flowmeter 12 so as to operatively provide a measure of the fuel temperature. The proper placement of the temperature sensor is a matter of efficiency in terms of optimizing its performance with regard to reliably and accurately measuring the fuel temperature. The temperature sensor may be provided in the form of a conventional probe having its associated temperature-sensing element disposed proximate rotor 16 in the region of the Hall-effect sensing elements 26 and 28, for example. The temperature probe would therefore be configured, at least in part, within mounting structure 18 along with Hall-effect sensor 20. The electrical lead from the probe that carries the temperature-indicating signal can be arranged to traverse the same physical path as the electrical leads 30, 32 for the Hall-effect sensor. The same processor that analyzes the Hall-effect sensor output signals can be used to process the temperature signal.

It is known that volume of fuel changes with temperature. In some counties, oil companies are required to convert the volume of fuel dispensed to a mean temperature of 60° F., thus the temperature of the fuel needs to be determined as product is measured. This is more commonly referred to as temperature Compensation.

The pick-up assembly disclosed herein incorporating the illustrated Hall-effect sensor represents a very favorable design in terms of requiring only a single sensor device and a single mounting hole for accommodating the mounting structure that houses the sensor. The absence of any extra parts or elaborate construction details distinguishes this assembly over certain conventional arrangements that require customized features both in the sensor design and in the manner of integrating the sensor with the flowmeter.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An assembly for use in a liquid dispensing system, said assembly comprising:
    a flowmeter coupled to a liquid line of said liquid dispensing system and including a rotor;
    a pick-up assembly mounted on said flowmeter and said pickup assembly provides a measure of a flow rate of liquid in said liquid line as a function of a rotational velocity of said rotor; and
    said pick-up assembly comprising:
        a Hall-effect sensor arranged opposite said rotor and said Hall-effect sensor provides at least one output signal representative of the rotational velocity of said rotor, said Hall-effect sensor having a first Hall-effect element generating a first channel signal representative of the rotational velocity of said rotor, said Hall-effect sensor having a second Hall-effect element generating a second channel signal representative of the rotational velocity of said rotor, said rotor including at least one recessed area formed therein exhibiting magnetic properties and being arranged with respect to said Hall-effect sensor so as to enable said at least one recessed area to exert a characteristic magnetic influence upon said Hall-effect sensor during rotor rotation; and
        a processor connected to said Hall-effect sensor for providing a measure of a liquid flow rate in said liquid line as derived from at least one output signal provided by said Hall-effect sensor.

2. The assembly as recited in claim 1, wherein the first channel signal generated by said first Hall-effect element and the second channel signal generated by said second Hall-effect element have a predetermined phase-shift therebetween.

3. The assembly as recited in claim 2, wherein said first Hall-effect element and said second Hall-effect element are arranged adjacent to one another in a spaced-apart relationship sufficient to cause a 90 degree phase-shift between said respective first channel signal and said second channel signal generated thereby.

4. The assembly as recited in claim 2, wherein said processor evaluates the first channel signal generated by said first Hall-effect element and the second channel signal generated by said second Hall-effect element to derive the measure and flow direction of said liquid flow rate.

5. The assembly as recited in claim 2, wherein said at least one recessed area further comprises:
    a set of three recessed areas disposed in spaced-apart relationship about a circumferential surface of said rotor.

6. The assembly as recited in claim 1, wherein said Hall-effect sensor is disposed, at least in part, within a housing structure mounted to said flowmeter, said flowmeter mounting being characterized by a single mounting space defined in said flowmeter for receiving, at least in part, said housing structure.

7. The assembly as recited in claim 1, further comprises:
    a temperature sensor integrally associated with said pick-up assembly and being arranged with respect to said liquid line of said liquid dispensing system to provide a measure of a liquid temperature.

8. An assembly for use in a liquid dispensing system, said assembly comprising:
    a flowmeter coupled to a liquid line of said fuel dispensing system and including a rotor;
    said rotor including at least one discontinuity provided in a circumferential surface thereof to define a discontinuous portion of said rotor;
    detection means, disposed opposite said rotor at the discontinuous portion thereof, for detecting the occurrence of each one of said at least one rotor discontinuity rotating therepast and for generating at least one signal representative of a rotational velocity of said rotor as derived from the rate of detected occurrence of at least one of said at least one rotor discontinuity;
    means connected to said detection means for providing a measure of the flow rate of liquid in said liquid line as derived from the at least one signal generated by said detection means; and
    a Hall-effect sensor arranged with respect to said at least one rotor discontinuity so as to enable each one of said at least one rotor discontinuity to exert a characteristic magnetic influence upon said Hall-effect sensor during rotor rotation, said Hall-effect sensor having a first Hall-effect element generating a first channel signal representative of the rotational velocity of said rotor, said Hall-effect sensor having a second Hall-effect element generating a second channel signal representative of the rotation velocity of said rotor.

9. The assembly as recited in claim 8, wherein each one of said at least one rotor discontinuity exhibits magnetic properties.

10. The assembly as recited in claim 9, wherein each one of said at least one rotor discontinuity further comprises:
   a recessed area formed in said rotor.

11. The assembly as recited in claim 8, wherein the first channel signal generated by said first Hall-effect element and the second channel signal generated by said second Hall-effect element have a predetermined phase-shift therebetween.

12. The assembly as recited in claim 11, wherein said first Hall-effect element and said second Hall-effect element are arranged adjacent to one another in a spaced-apart relationship sufficient to cause a 90 degree phase-shift between said respective first channel signal and said second channel signal generated thereby.

13. The assembly as recited in claim 11, wherein said at least one rotor discontinuity further comprises:
   a set of three recessed areas formed in said rotor and disposed in spaced-apart relationship about the circumferential surface of said rotor.

14. The assembly as recited in claim 13, wherein for each complete rotation of said rotor, each one of the first channel signal and the second channel signal generated respectively by said first Hall-effect element and said second Hall-effect element includes a representation of the detected occurrence of each one of said set of three recessed areas formed in said rotor.

15. The assembly as recited in claim 8, wherein said Hall-effect sensor is disposed, at least in part, within a housing structure mounted to said flowmeter, said flowmeter mounting being characterized by the use of a single mounting space defined in said flowmeter for receiving, at least in part, said housing structure.

16. The assembly as recited in claim 8, further comprises:
   a temperature sensor having said detection means and being suitably arranged with respect to said liquid line of said liquid dispensing system to operatively provide a measure of the liquid temperature.

17. An assembly for use in a liquid dispensing system, said assembly comprising:
   a flowmeter coupled to a liquid line of said liquid dispensing system and including a rotor;
   said rotor including at least one discontinuity defined in a outer surface thereof and which exhibits magnetic properties;
   a Hall-effect sensor arranged opposite said rotor to enable the development of an inductive coupling relationship between each one of the at least one rotor discontinuity and said Hall-effect sensor during operative rotation of said rotor, said Hall-effect sensor comprising:
   a first Hall-effect element generating a first channel signal representative of a rotational velocity of said rotor, and
   a second Hall-effect element generating a second channel signal representative of the rotational velocity of said rotor,
   wherein said first channel signal and said second channel signal have a predetermined phase-shift therebetween; and
   a processor being operative to provide a measure of a flow rate of liquid in said liquid line based upon the first channel signal and the second channel signal generated respectively by said first Hall-effect element and said second Hall-effect element.

18. The assembly as recited in claim 17, wherein said at least one rotor discontinuity further comprises:
   a set of three recessed areas disposed in spaced-apart relationship about the outer surface of said rotor.

19. The assembly as recited in claim 17, wherein said Hall-effect sensor is disposed, at least in part, within a housing structure mounted to said flowmeter, said flowmeter mounting being characterized by the use of a single mounting space defined in said flowmeter for receiving, at least in part, said housing structure.

20. The assembly as recited in claim 17, further comprises:
   a temperature sensor associated with said Hall-effect sensor and being suitably arranged with respect to said liquid line of said liquid dispensing system to provide a measure of the liquid temperature.

\* \* \* \* \*